(12) United States Patent
Luo et al.

(10) Patent No.: US 8,077,441 B2
(45) Date of Patent: Dec. 13, 2011

(54) INTERFACE CIRCUIT AND COMMUNICATION DEVICE

(75) Inventors: Hongting Luo, Shenzhen (CN); Yangli Dai, Shenzhen (CN); Pingfang Yu, Shenzhen (CN); Qinghai Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/853,720

(22) Filed: Aug. 10, 2010

(65) Prior Publication Data
US 2011/0026178 A1 Feb. 3, 2011

Related U.S. Application Data

(63) Continuation of application No. PCT/CN2009/070674, filed on Mar. 6, 2009.

(30) Foreign Application Priority Data

Mar. 17, 2008 (CN) .......................... 2008 1 0026832

(51) Int. Cl.
*H02H 3/20* (2006.01)
(52) U.S. Cl. ...................................... 361/91.1
(58) Field of Classification Search ............... 361/91.1, 361/11, 119, 56; 710/12; 370/392; 307/17
See application file for complete search history.

(56) References Cited

U.S. PATENT DOCUMENTS

| | | | |
|---|---|---|---|
| 5,796,781 A | 8/1998 | DeAndrea et al. | |
| 5,995,353 A * | 11/1999 | Cunningham et al. | 361/111 |
| 6,541,878 B1 * | 4/2003 | Diab | 307/17 |
| 6,577,689 B1 | 6/2003 | Smith et al. | |
| 6,741,612 B1 * | 5/2004 | Butler et al. | 370/501 |
| 2008/0062600 A1 | 3/2008 | Crawley et al. | |

FOREIGN PATENT DOCUMENTS

| | | |
|---|---|---|
| CN | 2631138 | 8/2004 |
| CN | 2922307 | 7/2007 |
| EP | 0886361 | 12/1998 |

OTHER PUBLICATIONS

International Search Report, mailed May 28, 2009, in corresponding International Application PCT/CN2009/070674 (4 pp.).
Extended European Search Report, mailed Jul. 28, 2011, in European Application No. 09722061.0 (8 pages).

* cited by examiner

*Primary Examiner* — Rexford Barnie
*Assistant Examiner* — Angela Brooks
(74) *Attorney, Agent, or Firm* — Staas & Halsey LLP (57) ABSTRACT

An interface circuit and a communication device are provided. The interface circuit includes a transformer unit, a protection unit, and an interface unit. A secondary side of the transformer unit is connected with a chip. A first terminal of the protection unit is electrically connected with a center tap of a primary side of the transformer unit, and a second terminal of the protection unit is grounded. A first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit respectively.

18 Claims, 8 Drawing Sheets

INTERFACE CIRCUIT AND COMMUNICATION DEVICE

CROSS-REFERENCE TO RELATED APPLICATIONS

This application is a continuation of International Application No. PCT/CN2009/070674, filed on Mar. 6, 2009, which claims priority to Chinese Patent Application No. 200810026832.5, filed on Mar. 17, 2008, both of which are hereby incorporated by reference in their entireties.

FIELD OF THE TECHNOLOGY

The present invention relates to the field of electronic communication, and more particularly to an interface circuit and a communication device.

BACKGROUND OF THE INVENTION

With the rapid development of enterprise data communication services, residential area broadband access services, and related convergence services, Ethernet is applied in a broader range. The number of Ethernet devices is increased greatly whose network locations cover the high-end, the intermediate-end, and the low-end. With wide applications of the Ethernet devices, subscribers put more emphasis on device reliability, and pose higher requirements for protecting Ethernet ports.

Figure 1:
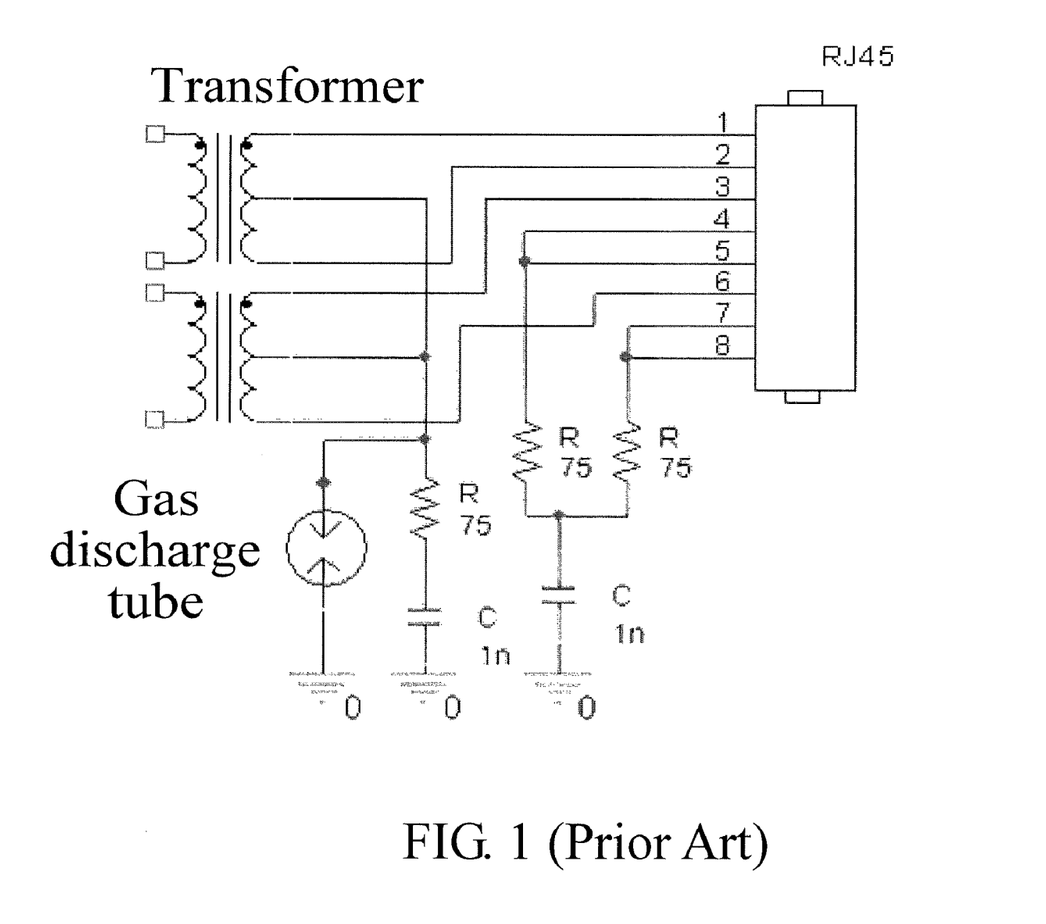
FIG. 1 is a schematic view of an Ethernet port protection circuit according to the prior art.

For the Ethernet ports, an over-voltage of network cable induction is mainly in a common-mode. Hence, a current ordinary protection circuit is as shown in FIG. 1. An Ethernet interface circuit includes a transformer unit and a network port (RJ45 interface) that are connected with an Ethernet chip. Signal lines 1 and 2 of the network port are electrically connected with a receiving terminal of the transformer unit, signal lines 3 and 6 are connected with a sending terminal of the transformer unit, and signal lines 4, 5, 7, and 8 are idle. An over-voltage of the signal lines 1, 2, 3, and 6 of the network port (RJ45 interface) is discharged through a gas discharge tube connected with a center tap of the transformer unit, and the idle signal lines 4, 5, 7, and 8 of the network port are connected with a Bob-smith circuit to withstand an over-voltage through insulation and withstand voltage.

In a process of implementing the present invention, the inventor finds that the prior art at least has the following problems.

Figure 2:
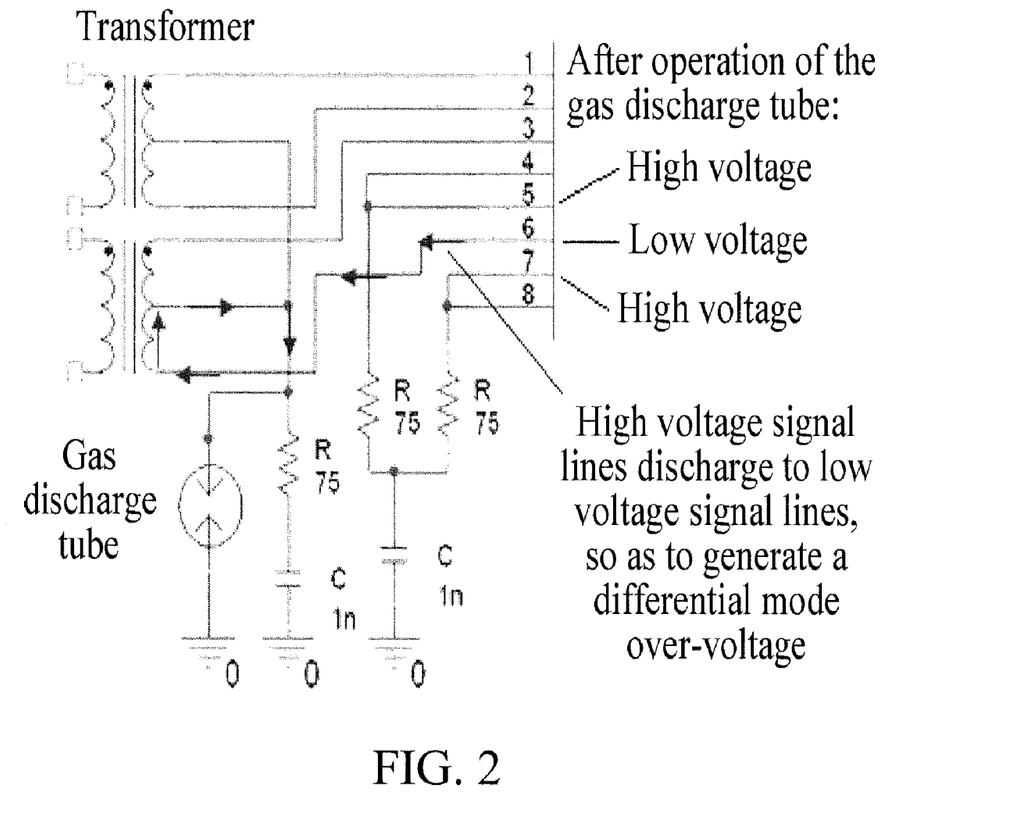
FIG. 2 is a schematic view of potential difference generated by the protection circuit in FIG. 1 when a surge voltage is higher.

When a surge voltage is higher, the over-voltage on the signal lines 1, 2, 3, and 6 is changed to a low voltage by clamping of the gas discharge tube connected with the center tap of the transformer, while the signal lines 4, 5, 7, and 8 withstanding the over-voltage through the insulation and withstand voltage are still at a high voltage. At this time, the signal lines 4, 5, 7, and 8 discharge to the signal lines 1, 2, 3, and 6 at a modular plug of an RJ45 connector. As shown in FIG. 2, the signal lines 5 and 7 discharge to the signal line 6, which causes a common-mode over-voltage in a large magnitude to convert into a differential mode over-voltage, so as to damage the Ethernet chip. That is to say, a problem of damaging the Ethernet chip since the common-mode over-voltage is converted into the differential mode over-voltage due to potential difference between the signal lines 1, 2, 3, and 6 and the signal lines 4, 5, 7, and 8 exists in a current Ethernet port protection circuit.

SUMMARY OF THE INVENTION

Accordingly, the present invention is directed to an interface circuit and a communication device, which can solve a problem that a common-mode over-voltage is converted into a differential mode over-voltage due to potential difference between signal lines, and improve the reliability of Ethernet.

In an embodiment, the present invention provides an interface circuit, which includes a transformer unit, a protection unit, and an interface unit.

A first terminal of the protection unit is connected with a center tap of a primary side of the transformer unit, and a second terminal of the protection unit is grounded.

A first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit.

Correspondingly, in an embodiment, the present invention further provides an interface circuit, which includes at least two transformer units, a protection unit, and at least two interface units.

A first terminal of the protection unit is connected with center taps of primary sides of the at least two transformer units, and a second terminal of the protection unit is grounded.

A first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit.

Correspondingly, in an embodiment, the present invention further provides a communication device, which includes a printed circuit board. The printed circuit board includes a chip and an interface circuit, and the interface circuit includes a transformer unit, a protection unit, and an interface unit.

A secondary side of the transformer unit is connected with the chip.

A first terminal of the protection unit is electrically connected with a center tap of a primary side of the transformer unit, and a second terminal of the protection unit is grounded.

A first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit.

Correspondingly, in an embodiment, the present invention further provides an interface circuit. The interface circuit includes a transformer unit, a protection unit, and an interface unit.

A receiving terminal and a sending terminal of the transformer unit are connected with a signal line of the interface unit, and other signal lines of the interface unit and a center tap of a primary side of the transformer unit are grounded through the protection unit.

According to an interface circuit and a communication device proposed in the embodiments of the present invention, a third access terminal (that is, signal lines 4 and 5 of a network port) and a fourth access terminal (that is, signal lines 7 and 8 of the network port) of an Ethernet interface are grounded through a protection unit, meanwhile a first access terminal (that is, signal lines 1 and 2 of the network port) and a second access terminal (that is, signal lines 3 and 6 of the network port) are connected with a center tap of a first port and a second port of a primary side of a transformer unit, and then the center tap is connected with the protection unit. When a surge voltage is higher, voltages of the first access terminal, the second access terminal, the third access terminal, and the fourth access terminal are changed to a low voltage by clamping of the same protection unit, so that a problem that a common-mode over-voltage is converted into a differential mode over-voltage due to potential difference between the first/second access terminal and the third/fourth access terminal is eliminated, thus enhancing the systemic protection performance, and improving the reliability.

DETAILED DESCRIPTION OF THE EMBODIMENTS

An interface circuit according to an embodiment of the present invention is set forth hereinafter in detail in connection with an accompanying drawing.

An interface circuit according to an embodiment of the present invention includes a transformer unit, a protection unit, and an interface unit. A secondary side of the transformer unit is connected with a chip.

A first terminal of the protection unit is connected with a center tap of a primary side of the transformer unit, and a second terminal of the protection unit is grounded.

A first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit.

In the embodiment, the interface circuit may be an Ethernet interface circuit, the chip may be an Ethernet chip, and the interface unit may be an RJ45 unit.

The protection unit may be a gas discharge tube, or a semiconductor discharge tube, or a discharge gap, or a pressure-sensitive resistor, or a transient suppression diode, or a combination of any two of them.

It can be seen from the foregoing that, the third access terminal and the fourth access terminal of the interface unit are grounded through the first terminal of the protection unit, the first access terminal of the interface unit is connected with the first port of the primary side of the transformer unit, and the second access terminal of the interface unit is connected with the second port of the primary side of the transformer unit. When a surge voltage is higher, voltages of the first access terminal, the second access terminal, the third access terminal, and the fourth access terminal are changed to a low voltage by clamping of the same protection unit, so that a problem that a common-mode over-voltage is converted into a differential mode over-voltage due to potential difference between the first/second access terminal and the third/fourth access terminal is eliminated.

Hereinafter, embodiments of the present invention are set forth in detail with an interface circuit being an Ethernet interface circuit, a chip being an Ethernet chip, an interface unit being an RJ45 unit, and by reference to the accompanying drawings of the specification.

In the embodiments of the present invention, signal lines 1 and 2 of the RJ45 unit are referred to as a first access terminal, signal lines 3 and 6 are referred to as a second access terminal, signal lines 4 and 5 are referred to as a third access terminal, and signal lines 7 and 8 are referred to as a fourth access terminal.

Figure 3:
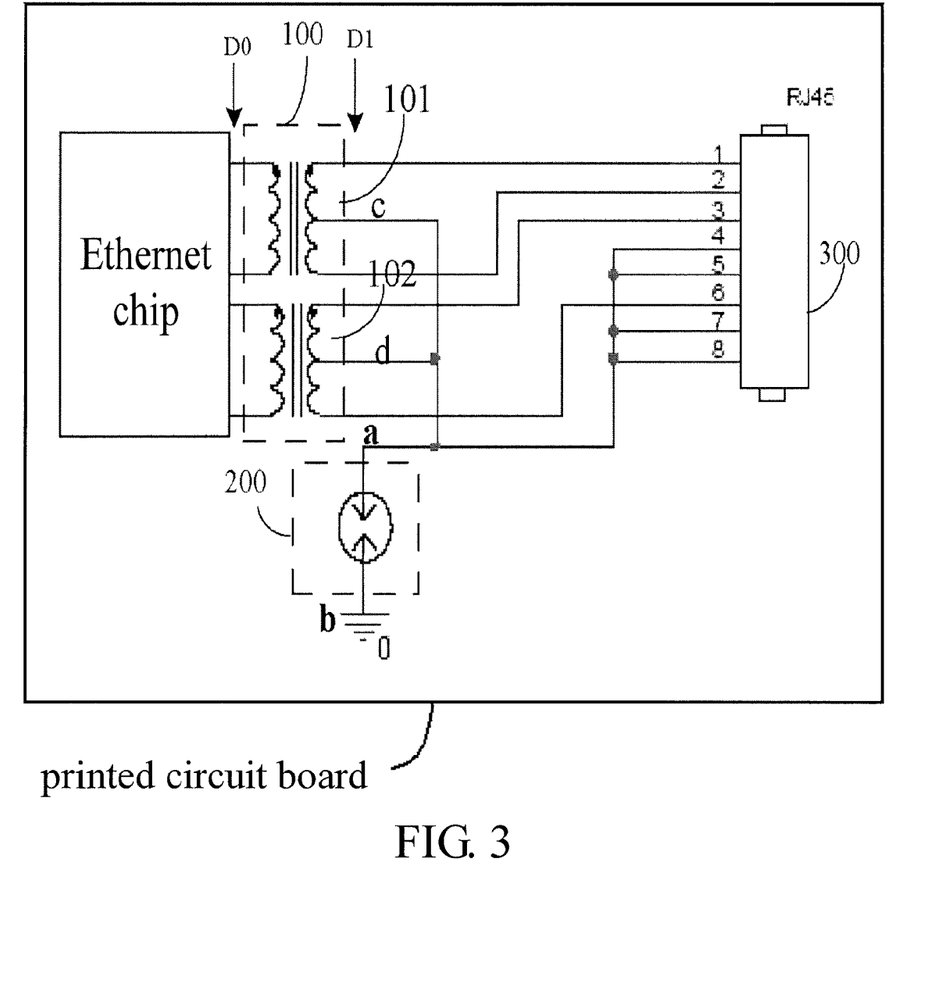
FIG. 3 is a schematic structural view of an interface circuit according to a first embodiment of the present invention.

FIG. 3 is a schematic structural view of a first embodiment of an interface circuit according to the present invention. Referring to FIG. 3, an Ethernet interface circuit includes a transformer unit 100, a protection unit 200, and an RJ45 unit 300.

A secondary side of the transformer unit 100 is connected with an Ethernet chip, and a primary side of the transformer includes a first port 101 and a second port 102.

A first terminal a of the protection unit 200 is connected with a center tap c of a first port 101 and a center tap d of a second port 102 of the primary side of the transformer unit 100, and a second terminal b of the protection unit 200 is grounded.

A first access terminal of the RJ45 unit 300 is connected with the first port 101 of the primary side of the transformer unit 100, a second access terminal of the RJ45 unit 300 is connected with the second port 102 of the primary side of the transformer unit 100, and a third access terminal and a fourth access terminal of the RJ45 unit 300 are electrically connected with the first terminal a of the protection unit 200.

The secondary side of the transformer unit 100 is a side pointed to by an arrow D0 in FIG. 3, and the primary side of the transformer unit 100 is a side pointed to by an arrow D1 in FIG. 3.

The first port 101 of the transformer unit 100 may be a sending terminal, and the second port 102 may be a receiving terminal.

It should be noted that, if the first port 101 of the primary side of the transformer unit 100 is the receiving terminal, the second port 102 is the sending terminal; or if the first port 101 of the primary side of the transformer unit 100 is the sending terminal, the second port 102 is the receiving terminal.

Referring to FIG. 3 again, the protection unit 200 is a protection apparatus. Further, the protection unit 200 may also be multiple protection apparatuses connected in parallel or in series.

The protection apparatus may be a gas discharge tube, or a semiconductor discharge tube, or a discharge gap, or a pressure-sensitive resistor, or a transient suppression diode, and so on.

In this example, when a surge voltage is higher, voltages on signal lines 1, 2 and signal lines 3, 6 of the RJ45 unit 300 are changed to a low voltage by clamping of the protection unit 200, where the protection unit 200 is connected with the center tap c and the center tap d of the transformer unit 100, and voltages on signal lines 4, 5 and signal lines 7, 8 of the RJ45 unit 300 are also changed to a low voltage by clamping of the protection unit 200, which effectively avoids potential difference generated between the signal lines 1, 2, 3, and 6 and the signal lines 4, 5, 7, and 8, and solves a problem that a common-mode over-voltage is converted into a differential mode over-voltage in a case of a high magnitude over-voltage.

Figure 4:
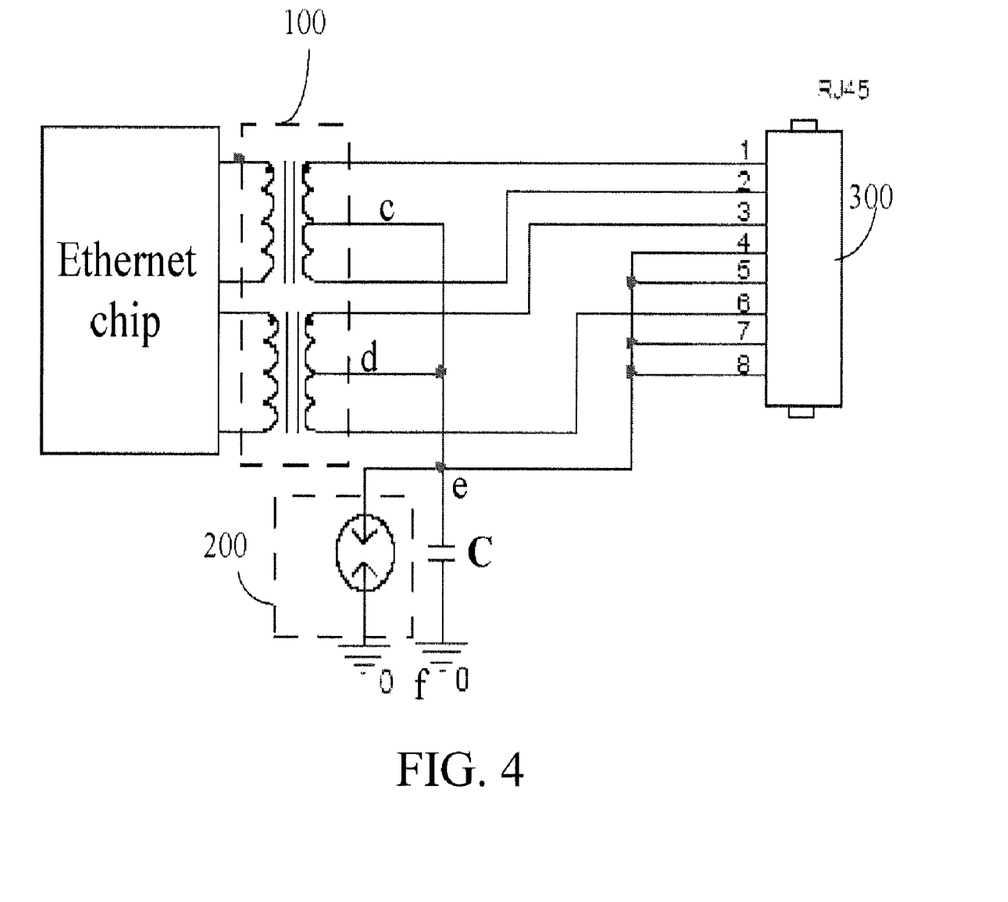
FIG. 4 is a schematic structural view of an interface circuit according to a second embodiment of the present invention.

FIG. 4 is a schematic structural view of a second embodiment of an interface circuit according to the present invention. As shown in FIG. 4, difference between the second embodiment and the first embodiment lies in that, the Ethernet interface circuit further includes a capacitor C. The capacitor C is connected in parallel with a protection unit 200, constituting a parallel circuit. A node e of the parallel circuit is connected with a center tap c and a center tap d of a primary side of the transformer unit 100 and a third access terminal and a fourth access terminal of the RJ45 unit 300, The other terminal f of the capacitor C is grounded. The capacitor C performs filtering, and has a rated voltage being at least 1500 volts and a capacitance being 0.001 μF, which are in favor of suppressing working frequency points of an Ethernet port and EMI interference caused by their harmonic waves. Definitely, capacitance of the capacitor may also be 0.1 μF or 0.01 μF, which cause different EMI suppression effects.

Figure 5:
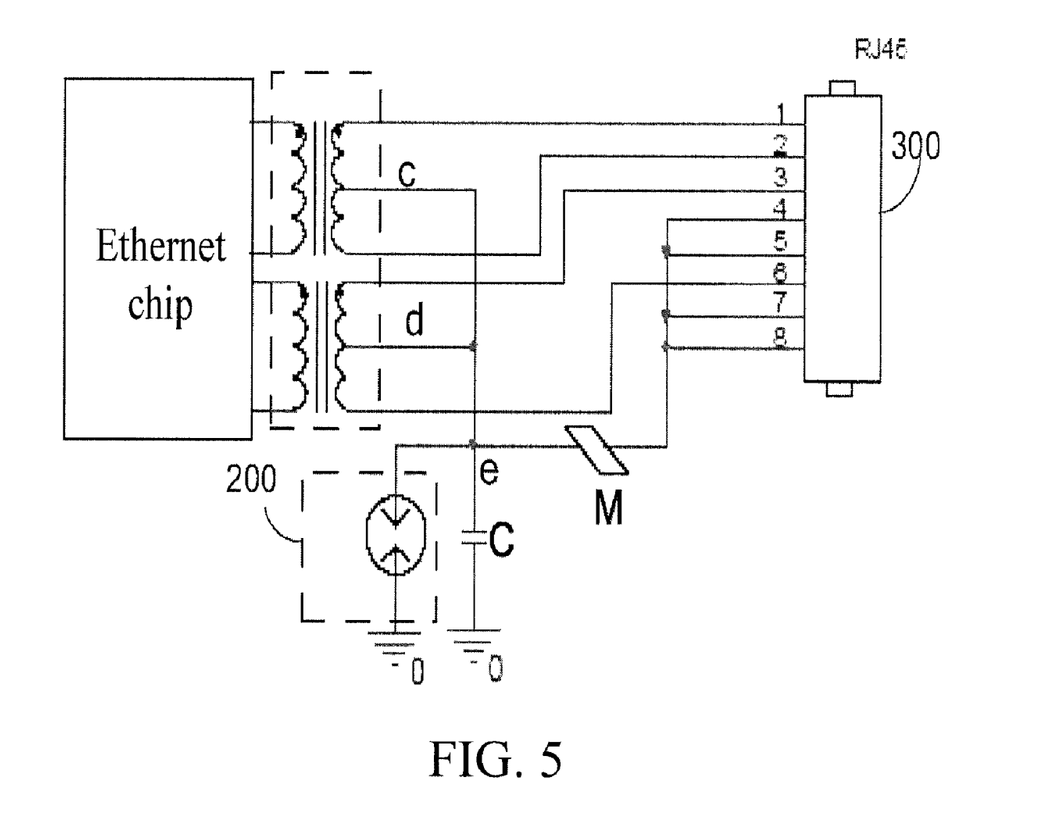
FIG. 5 is a schematic structural view of an interface circuit according to a third embodiment of the present invention.

FIG. 5 is a schematic structural view of a third embodiment of an interface circuit according to the present invention. As shown in FIG. 5, difference between the third embodiment and the second embodiment lies in that, in the Ethernet interface circuit, a third access terminal (signal lines 4 and 5) and a fourth access terminal (signal lines 7 and 8 of the RJ45) of the RJ45 unit 300 are electrically connected with a node e of a parallel circuit including the protection unit 200 and the capacitor C through a magnetic bead M. The magnetic bead is adapted to block common-mode noise, and guarantee that the common-mode noise does not pass through the signal lines 4, 5, 7, and 8 to cause overlarge EMI. Direct current impedance of the magnetic bead is 0.1 ohm or less, direct current through-current capacity of the magnetic bead is 2 amperes or more, and high frequency impedance of the magnetic bead at 100 MHz is 100 ohms or more.

It should be noted that, for the third embodiment, when the filtering requirement is not high, the capacitor C of the Ethernet interface circuit as shown in FIG. 5 may be removed, that is, the third access terminal (the signal lines 4 and 5) and the fourth access terminal (the signal lines 7 and 8 of the RJ45) of the RJ45 unit 300 are electrically connected with a first terminal of the protection unit 200 through a magnetic bead M.

Figure 6:
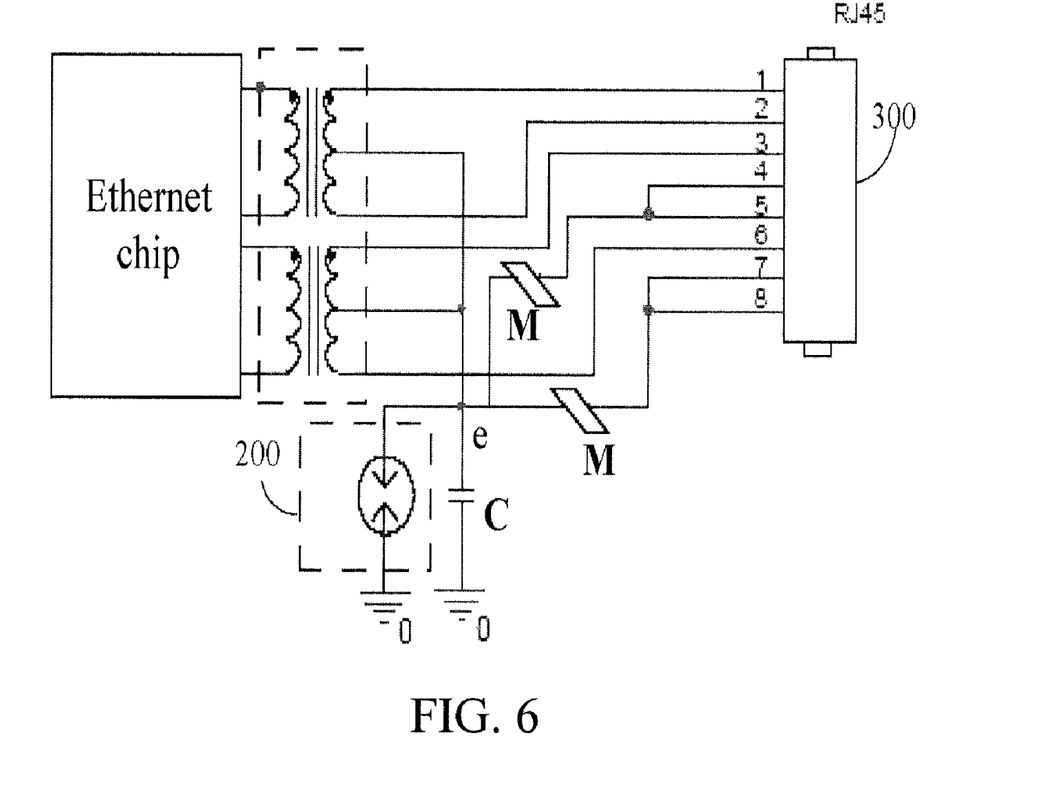
FIG. 6 is a schematic structural view of an interface circuit according to an embodiment of the present invention.

Further, under a specific electromagnetic environment, the count of the magnetic bead is not limited to one as shown in FIG. 5, and multiple magnetic beads are available. As shown in FIG. 6, in the Ethernet interface circuit, a third access terminal (signal lines 4 and 5 of RJ45) and a fourth access terminal (signal lines 7 and 8 of the RJ45) of the RJ45 unit 300 are electrically connected with a terminal e of a parallel circuit including the protection unit 200 and the capacitor C through a magnetic bead M respectively. Definitely, during specific implementation, when the filtering requirement is not high, the capacitor C can be removed.

Figure 7:
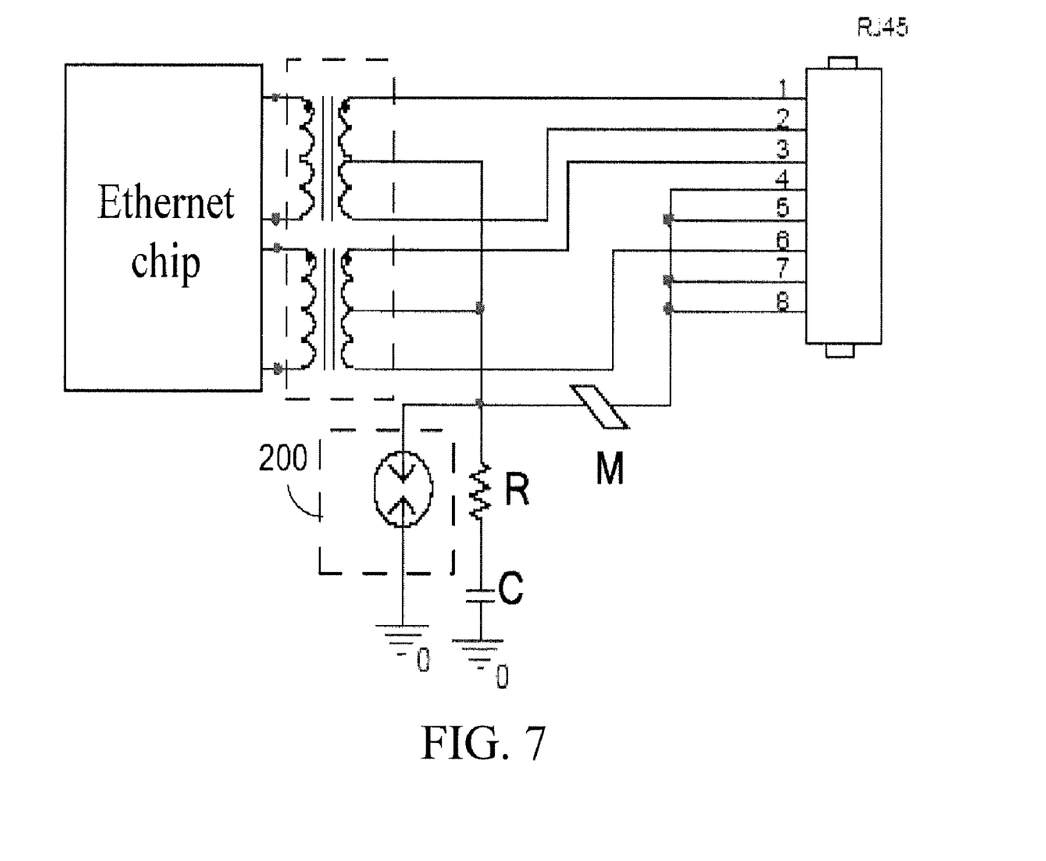
FIG. 7 is a schematic structural view of an interface circuit according to a fourth embodiment of the present invention.

FIG. 7 is a schematic structural view of a fourth embodiment of an interface circuit according to the present invention. As shown in FIG. 7, difference between the fourth embodiment and the third embodiment lies in that, in order to guarantee line impedance of signal lines 1, 2, 3, and 6 of an RJ45 unit, the Ethernet interface circuit can further include a resistor R. The resistor R is connected in series with a capacitor C, and then is connected in parallel with a protection unit 200. One terminal of the circuit after being connected in parallel is connected with the magnetic bead M, and the other terminal is grounded. Resistance of the resistor can be 50 ohms to 120 ohms. When the resistance is 75 ohms, it generally is in favor of matching impedance of Ethernet signal lines. Definitely, the resistance can also be 50 ohms or 120 ohms, which is decided according to the impedance requirement of the Ethernet signal lines.

Figure 8:
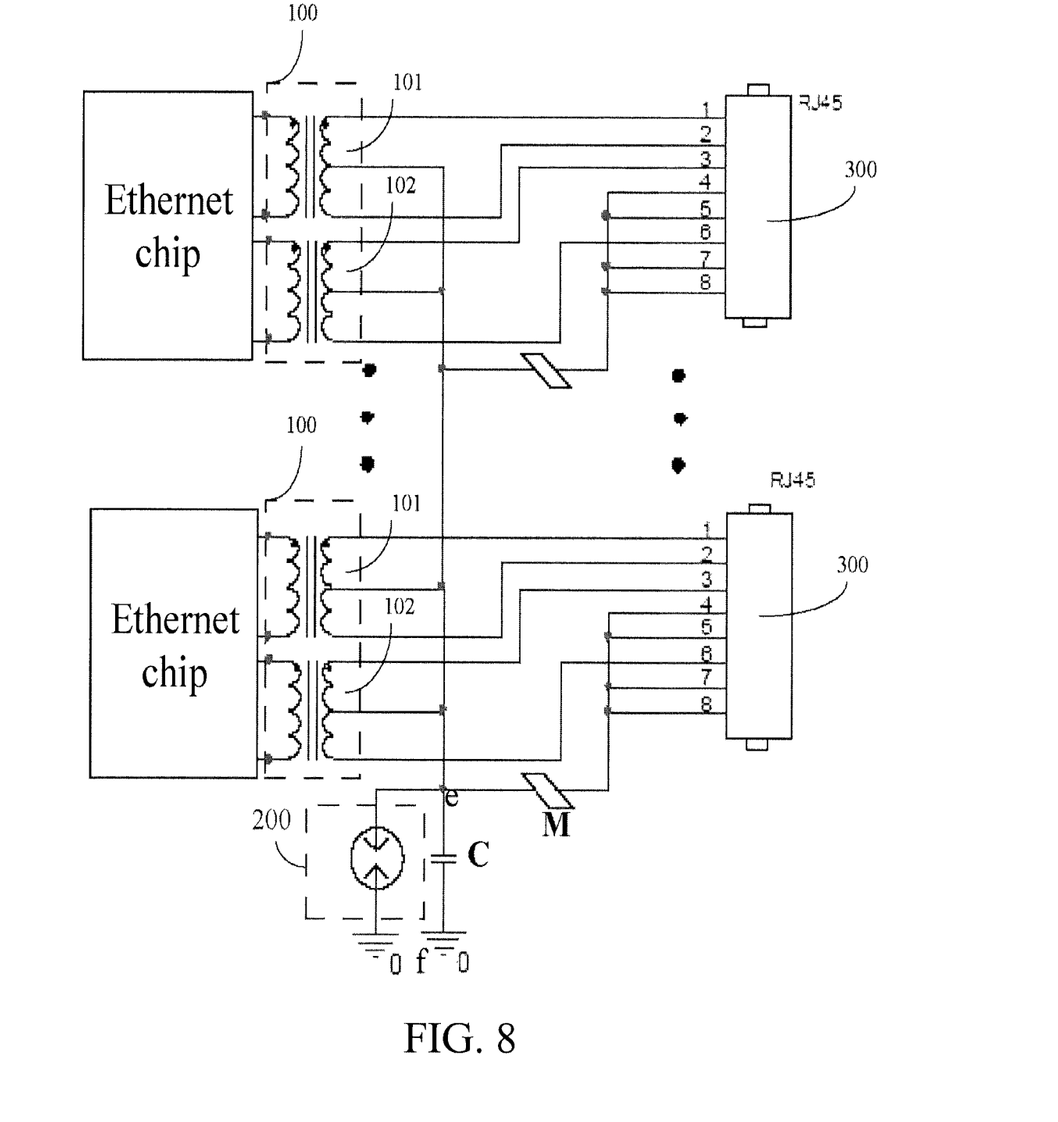
FIG. 8 is a schematic structural view of an interface circuit according to an embodiment of the present invention.

It should be noted that, during specific implementation, multi-channel Ethernet ports can share one protection unit. As shown in FIG. 8, an interface circuit includes at least two transformer units 100, a protection unit 200, and at least two interface units 300 (such as RJ45 unit).

Secondary side of the at least two transformer units 100 are connected with a chip (such as Ethernet chip).

A first terminal of the protection unit 200 is connected with center taps of primary sides of the at least two transformer units 100, and a second terminal of the protection unit 200 is grounded.

A first access terminal (signal lines 1 and 2) of the interface unit is connected with a first port 101 of the primary side of the transformer unit 100, a second access terminal (signal lines 3 and 6) of the interface unit 300 is connected with a second port 102 of the primary side of the transformer unit 100, and a third access terminal (signal lines 4 and 5) and a fourth access terminal (signal lines 7 and 8) of the interface unit 300 are electrically connected with the first terminal of the protection unit 200.

It should be noted that, if the first port 101 of the primary side of the transformer units 100 is a receiving terminal, the second port 102 is a sending terminal; or if the first port 101 of the primary side of the transformer units 100 is the sending terminal, the second port 102 is the receiving terminal.

During specific implementation, the interface circuit includes a capacitor C, which is connected in parallel with the protection unit 200, constituting a parallel circuit, A node e of the parallel circuit is connected with the center tap of the primary side of the transformer unit, and the third access terminal and the fourth access terminal of the interface unit 300 are electrically connected with the node e through a magnetic bead M. The other terminal f of the parallel circuit is grounded. Alternatively, the other terminal f of the parallel circuit including the protection unit 200 and the capacitor C is connected to a chassis ground.

During specific implementation, when the chassis ground of a device is a "net ground" (the so-called "net ground" refers to that no electromagnetic noise exists on a ground-plane, and ground potential is zero), the magnetic bead M can be removed. When it is needed to guarantee line impedance of the signal lines 1, 2, 3, and 6 of the RJ45 unit, the capacitor C is connected in series with a resistor. When the filtering requirement is not high, the protection unit can only include one protection apparatus.

Multi-channel Ethernet port circuits share one protection unit, which greatly reduces protection cost and occupied PCB space, thus improving the device integration level.

In an embodiment, the present invention provides a communication device, which includes a printed circuit board. The printed circuit board includes a chip and an interface circuit. The interface circuit includes a transformer unit, a protection unit, and an interface unit.

A secondary side of the transformer unit is connected with the chip.

A first terminal of the protection unit is electrically connected with a center tap of a primary side of the transformer unit, and a second terminal of the protection unit is grounded.

A first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit.

The interface circuit may be an Ethernet interface circuit, the chip is an Ethernet chip, and the interface unit is an RJ45 unit.

The communication device may be an Ethernet device, such as an exchanger, or a router, or a firewall device.

Hereinafter, the Ethernet device is set forth as an example. As shown in FIG. 3, the Ethernet interface circuit of the Ethernet device includes a transformer unit 100, a protection unit 200, and an RJ45 unit 300.

A secondary side of the transformer unit 100 is connected with an Ethernet chip, and a primary side of the transformer unit 100 includes a first port 101 and a second port 102.

A first terminal a of the protection unit 200 is electronically connected with a center tap c of a first port 101 and a center tap d of a second port 102 of the primary side of the transformer unit 100. A second terminal b of the protection unit 200 is grounded.

A first access terminal of the RJ45 unit 300 is connected with a first port 101 of the primary side of the transformer unit 100, a second access terminal of the RJ45 unit 300 is connected with the second port 102 of the primary side of the transformer unit 100, and a third access terminal and a fourth access terminal of the RJ45 unit 300 are electrically connected with the first terminal a of the protection unit 200 respectively.

In the foregoing, signal lines 1 and 2 of the RJ45 unit are referred to as a first access terminal, signal lines 3 and 6 are referred to as a second access terminal, signal lines 4 and 5 are referred to as a third access terminal, and signal lines 7 and 8 are referred to as a fourth access terminal.

Further, as shown in FIG. 4, the Ethernet interface circuit further includes a capacitor C. The capacitor C is connected in parallel with the protection unit 200, constituting a parallel circuit. A node e of the parallel circuit is connected with the center tap c and the center tap d of the primary side of the transformer unit 100 and the third access terminal and the fourth access terminal of the RJ45 unit 300. The other terminal f of the capacitor C is grounded.

Furthermore, as shown in FIG. 5, in the Ethernet interface circuit, the third access terminal (signal lines 4 and 5) and the fourth access terminal (signal lines 7 and 8 of the RJ45) of the RJ45 unit 300 are connected first, and then are electrically connected with the node terminal e of the parallel circuit including the protection unit 200 and the capacitor C through a magnetic bead M.

Furthermore, as shown in FIG. 7, in order to guarantee line impedance of signal lines 1, 2, 3, and 6 of an RJ45 unit, the Ethernet interface circuit can further include a resistor R. The resistor R is connected in series with the capacitor C and then is connected in parallel with the protection unit 200. One terminal of the circuit after being connected in parallel is connected with the magnetic bead M, and the other terminal is grounded.

It should be noted that, the Ethernet device according to the embodiment of the present invention may be an exchanger, or a router, or a modem, or a firewall device.

In conclusion, compared with a conventional Ethernet interface circuit, by selecting a magnetic bead with capacitance of 0.001 µF to 0.1 µF, direct current impedance of less than 10 ohms, and direct current through-current capacity of not smaller than 2 amperes to constitute a protection circuit with a protection apparatus, an interface circuit and communication device according to the embodiments of the present invention can satisfy the 1.2/50 µs combined wave, common-mode 6 kV protection specification of the IEC61000-4-5 standard requirement. A third access terminal (that is, signal lines 4 and 5 of a network port) and a fourth access terminal (that is, signal lines 7 and 8 of the network port) of an Ethernet interface are grounded through the protection unit, meanwhile a first access terminal (that is, signal lines 1 and 2 of the network port) and a second access terminal (that is, signal lines 3 and 6 of the network port) are connected with center taps of a first port and a second port of a primary side of a transformer unit, and then the center taps are connected with the protection unit. When a surge voltage is higher, voltages of the first access terminal, the second access terminal, the third access terminal, and the fourth access terminal are changed to a low voltage by clamping of the same protection unit, so that a problem that a common-mode over-voltage is converted into a differential mode over-voltage due to potential difference between the first/second access terminal and the third/fourth access terminal is eliminated, thus enhancing the systemic protection performance, and improving the reliability.

It should be noted that, in the description of the embodiments, some used terms are only used for reference, instead of limiting the present invention. For example, such numerals as "first", "second", "third", "fourth" and other numerals mentioned in the embodiments do not imply sequence or order.

It should be noted that the above descriptions are preferred embodiments of the present invention, and person having ordinary skill in the art may make various improvements and refinements without departing from the spirit of the invention. All such modifications and refinements are intended to be covered by the present invention.

What is claimed is:

1. An interface circuit, comprising:
  a transformer unit;
  a protection unit, wherein a first terminal of the protection unit is connected with a center tap of a primary side of the transformer unit, and a second terminal of the protection unit is grounded; and
  an interface unit, wherein a first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit.

2. The interface circuit according to claim 1, wherein the interface circuit comprises a capacitor connected in parallel with the protection unit, one terminal of the capacitor is connected with the center tap of the primary side of the transformer unit and the third access terminal and the fourth access terminal of the interface unit, and the other terminal of the capacitor is grounded.

3. The interface circuit according to claim 2, wherein the interface circuit further comprises a resistor, the resistor is connected in series with the capacitor to constitute a series circuit, and the series circuit is connected in parallel with the protection unit.

4. The interface circuit according to claim 1, wherein the third access terminal and the fourth access terminal of the interface unit are electrically connected with the first terminal of the protection unit through a magnetic bead.

5. The interface circuit according to claim 2, wherein the third access terminal and the fourth access terminal of the interface unit are electrically connected, through a magnetic bead, with a node formed after the protection unit is connected in parallel with the capacitor.

6. The interface circuit according to claim 1, wherein the chip is an Ethernet chip, and the interface unit is an RJ45 unit.

7. The interface circuit according to claim 2, wherein capacitance of the capacitor is 0.001 μF to 0.1 μF.

8. The interface circuit according to claim 3, wherein resistance of the resistor is 50 ohms to 120 ohms.

9. An interface circuit, comprising:
   at least two transformer units;
   a protection unit, wherein a first terminal of the protection unit is connected with center taps of primary sides of the at least two transformer units, and a second terminal of the protection unit is grounded; and
   at least two interface units, wherein a first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit.

10. The interface circuit according to claim 9, wherein the interface circuit comprises a capacitor connected in parallel with the protection unit, one terminal of the capacitor is connected with the center tap of the primary side of the transformer unit and the third access terminal and the fourth access terminal of the interface unit, and the other terminal of the capacitor is grounded.

11. The interface circuit according to claim 10, wherein the interface circuit further comprises a resistor, the resistor is connected in series with the capacitor to constitute a series circuit, and the series circuit is connected in parallel with the protection unit.

12. The interface circuit according to claim 9, wherein the third access terminal and the fourth access terminal of the interface unit are electrically connected with the first terminal of the protection unit through a magnetic bead.

13. The interface circuit according to claim 10, wherein the third access terminal and the fourth access terminal of the interface unit are electrically connected, through a magnetic bead, with a node formed after the protection unit is connected in parallel with the capacitor.

14. A communication device, comprising a printed circuit board, wherein the printed circuit board comprises a chip and an interface circuit, and the interface circuit comprises:
   a transformer unit, wherein a secondary side of the transformer unit is connected with the chip;
   a protection unit, wherein a first terminal of the protection unit is electrically connected with a center tap of a primary side of the transformer unit, and a second terminal of the protection unit is grounded; and
   an interface unit, wherein a first access terminal of the interface unit is connected with a first port of the primary side of the transformer unit, a second access terminal of the interface unit is connected with a second port of the primary side of the transformer unit, and a third access terminal and a fourth access terminal of the interface unit are electrically connected with the first terminal of the protection unit.

15. The communication device according to claim 14, wherein the interface circuit further comprises a capacitor connected in parallel with the protection unit, one terminal of the capacitor is connected with the center tap of the primary side of the transformer unit and the third access terminal and the fourth access terminal of the interface unit, and the other terminal of the capacitor is grounded.

16. The communication device according to claim 15, wherein the interface circuit further comprises a resistor connected in series with the capacitor to constitute a series circuit, and the series circuit is connected in parallel with the protection unit.

17. The communication device according to claim 14, wherein the third access terminal and the fourth access terminal of the interface unit are electrically connected with the first terminal of the protection unit through a magnetic bead.

18. The communication device according to claim 14, wherein the chip is an Ethernet chip, and the interface unit is an RJ45 unit.

* * * * *